Dec. 9, 1969  W. G. NECKERMAN  3,482,609
COVERING FOR SEED BED OR PLANT
Filed June 27, 1967
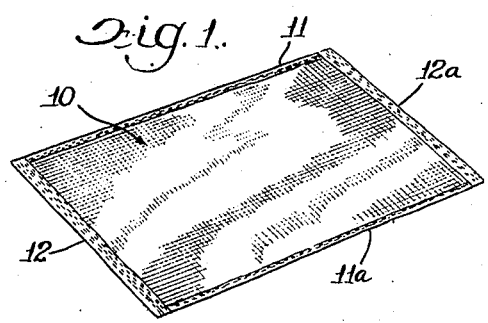
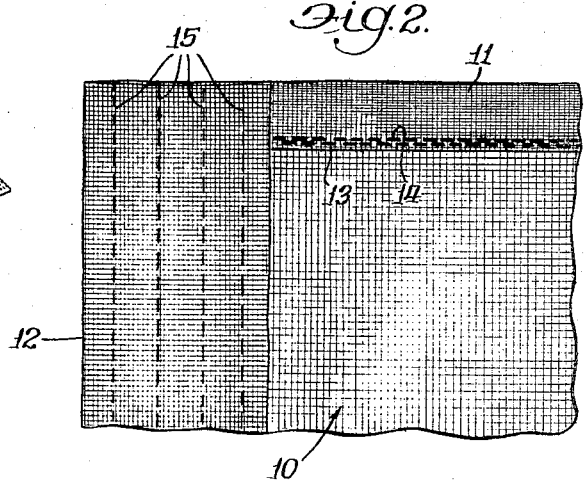
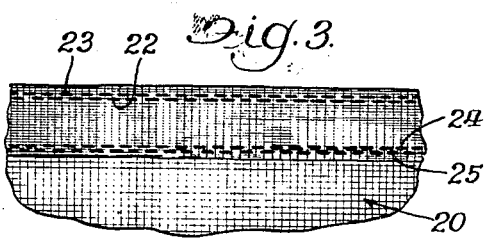
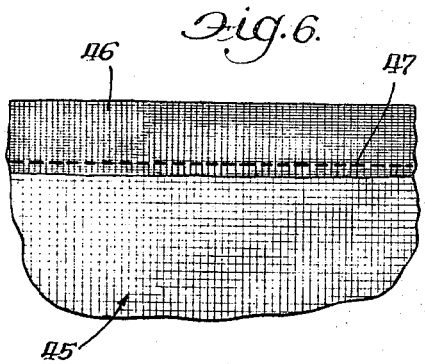
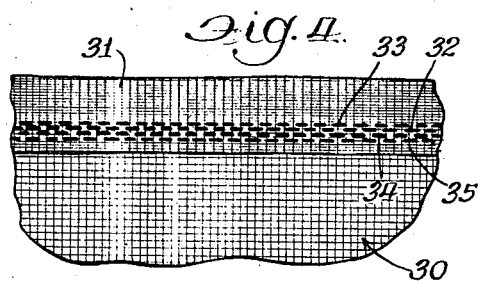
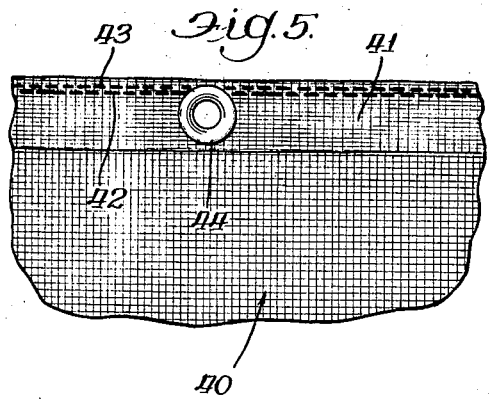
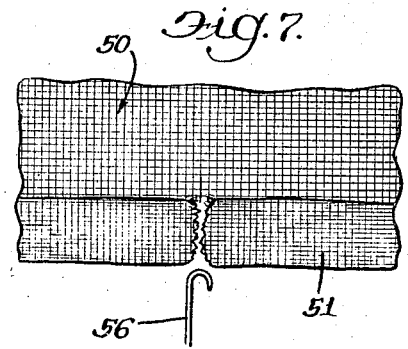
Inventor,
William G. Neckerman
By James J. Fawcett
Atty.

United States Patent Office 3,482,609
Patented Dec. 9, 1969

3,482,609
COVERING FOR SEED BED OR PLANT
William G. Neckerman, Charlotte, N.C., assignor to The Kendall Company, Walpole, Mass., a corporation of Massachusetts
Filed June 27, 1967, Ser. No. 649,210
Int. Cl. D03d 15/12, 9/00, 1/08
U.S. Cl. 139—383                8 Claims

ABSTRACT OF THE DISCLOSURE

Specifically the disclosure is concerned with substantially cellulosic seed bed and plant covers including in the selvage at least one rot-resistant reinforcing thread or yarn.

This invention is concerned with open mesh, woven fabric covers for seed beds or plants.

BACKGROUND OF THE INVENTION

Field of the invention

Farmers, nurserymen and plant growers in general conventionally employ light open mesh cotton woven fabrics known in the trade as tobacco cloth to cover seed beds, plant beds, individual plants and trees. These covers which normally are made of simple 1 x 1 weave mesh fabric with the usual one-half inch salvage may be impregnated with various antibacterial agents or fungicides, but in the interest of economy usually are untreated greige cloth. In general the main purpose of the cover is to protect the tender foliage from the effects of late frosts or the wilting effect of the hot sun, or to protect seeds or fruits such as berries and tomatoes from depletion by birds. Seed bed and plant covers are left on the ground for weeks and obviously are affected by the soil, but it has been uneconomical to make them entirely of rot-resistant synthetic yarns or from cellulosic yarns treated to make them rot-resistant. Such covers are generally fastened to the ground around the edges by metal spikes, sharpened canes, or sticks, which penetrate the fabric adjacent to but usually not through the selvage, thus preventing the cloth from being displaced by the winds. Sometimes the cover is left in place for as long as fourteen weeks. After use, covers are taken up and stored until they are to be used again. Unfortunately untreated cellulosic yarns tend to deteriorate rapidly when exposed to the sun and weather particularly when in contact with the earth. After such deterioration, the fastening spikes tend to tear through the selvage with the application of very little force so that it becomes difficult to stretch and properly maintain the cover in place. The provision of an inexpensive product prolonging the useful life of such covers is therefore a worthwhile objective.

Description of prior art

The Womelsdorf U.S. Patent No. 2,974,442 is concerned with a somewhat coarse tobacco cloth with reinforced warp stripes and selvages of higher yarn density. The Whitman U.S. Patent No. 2,401,997 is concerned with a much finer tobacco cloth with reinforced gromet patches extending into the body of the cover. The Simmons U.S. Patent No. 3,252,251 is concerned with woven covers with laminated films which are removable. Metallic plant protectors such as are illustrated in the Goldberg U.S. Patent No. 2,226,812, the Jacobs U.S. Patent No. 2,132,568, the Mather British Patent No. 386,280 accepted Jan. 12, 1933, and the Lederer German Patent No. 1,039,295, represent more remotely pertinent art. The Fluck et al U.S. Patent No. 3,317,345 describes rot-resistant finishes for textile materials.

SUMMARY OF THE INVENTION

The useful life of simple inexpensive woven seed bed and plant covers is undesirably short but an inexpensive product with a long useful life has not been provided heretofore.

It is the primary object of this invention to provide seed bed and plant covers with selvage edges which resist tear-out even though the untreated cellulosic yarn strength has been reduced by weathering and soil contact to a fraction of its original strength.

It is a further object of the invention to provide economical seed bed and plant covers with selvages each including one or more warp yarns which retain more strength, are more weather resistant and less subject to bacterial mold and mildew decomposition than the usual untreated wholly cellulosic yarn selvages.

Other objects of the invention will be apparent as the drawings and their description proceed.

Referring now to the drawings:

FIGURE 1 is an isometric view of a typical seed bed and plant cover of the invention FIGURE 2 is a plan view of a corner portion of the cover of FIGURE 1 in approximate size.

FIGURE 3 is a variation in the selvage of a cover of the invention.

FIGURE 4 is a further variation of the selvage of a cover of the invention.

FIGURE 5 is a variation of the selvage of a cover of the invention including a grommet.

FIGURE 6 illustrates a variation of the invention wherein a single warp yarn provides the reinforcement of the selvage.

FIGURE 7 illustrates a portion of a cover made with all untreated cellulosic yarns after soil and weather deterioration has weakened the selvage to the point where fastening devices tear through.

It has been discovered that while it is not economical to make entire seed bed and plant covers of rot-resistant materials, it is economical and some improvement is realized by incorporating even one rot-resistant yarn in the selvage. Two such warns in each selvage cause considerable improvement in use-life over untreated cellulosic covers without such rot-resistant yarns.

The products of this invention are substantially cellulosic open mesh light-weight fabrics woven with a warp-end count within the range of 12 to 40 ends per inch and a filling pick count within the range of about 4 to 36 picks per inch; however, in each of the selvages there is incorporated at least one and there may be as many as six or more yarns of rot-resistant material having a denier of at least 150 each and preferably about 800 denier each. These yarns are most effective when they are in pairs as immediately adjacent ends but the individual rot-resistant yarns may be separated. They are most effective when they are located about 2 to 8 warp ends from the body fabric but when placed at any point in the width of the selvage improvement will result. Any cellulosic yarn treated to impart rot resistance or any glass or synthetic polymer either continuous multifilament, monofilament or spun yarn which is strong and rot and weather resistant, such as for example olefin, polyamide, acrylic and polyester yarn, is satisfactory, particularly when such polymeric yarn is light stabilized to resist U.V. degradation where such degradation is characteristic of unstabilized yarn.

It is most economical to incorporate the reinforcing rot-resistant yarns into the selvage by using them as warp ends when the selvage is woven, but in lieu thereof the rot-resistant yarn may be incorporated as a sewing thread in the selvage in the warpwise direction.

DESCRIPTION OF THE DRAWINGS

Referring once more to the drawings:

In FIGURE 1, a woven substantially cellulosic seed bed and plant cover 10 of the invention is shown with selvages 11 and 11a each incorporating two rot-resistant warp yarns and with hemmed ends 12 and 12a being sewn with rows of rot-resistant thread or yarn.

In FIGURE 2, which illustrates a corner of the cover of FIGURE 1, selvage 11 is shown to include two adjacent rot-resistant warp yarns 13 and 14 and the hemmed end 12 is shown stitched with four rows 15 of rot-resistant thread. If this yarn is used in stitching the hem it may be of a denier in the range of sewing thread.

FIGURE 3 illustrates a portion of the selvage of a 1 x 1 weave cover 20 of the invention shown with two sets 22 and 23, and 24 and 25, of adjacent rot-resistant warp ends each in the selvage. This construction is preferred because of the improved appearance of a balanced selvage.

In FIGURE 4, a portion of the selvage of a cover 30 of the invention is shown using four adjacent rot-resistant warp ends 32, 33, 34 and 35 in the selvage 31. As many as six or more rot-resistant yarns may be used but if each yarn is weaker than about 450 grams, each tends to break individually. Covers with selvages reinforced only by such weaker yarns represent some improvement over covers with all non-treated cellulosic selvages, but they are less desirable than those with incorporated stronger yarns. In general, rot-resistant warp yarns each more than 1000 denier are more likely to pull out of the weakened cellulosic filling yarns than smaller yarns and such heavy yarns tend to be less flexible and are really stronger than necessary.

In FIGURE 5, a portion of variation of a cover 40 of the invention is shown with a metallic grommet 44 in the selvage 41 and with two adjacent rot-resistant warp yarns 42 and 43 in the selvage outwardly of the grommet hole. In this construction the stake fastening the cover to the ground passes through the grommet.

In FIGURE 6, a cover portion 45 is shown with a single rot-resistant yarn 47 forming the reinforcement for the selvage 46. While this cover is an improvement over covers of all untreated cellulosic yarn, it is not the preferred structure.

In FIGURE 7, the portion of the all untreated cellulosic yarn cover 50 is shown with a typical unreinforced selvage 51. After exposure to weather and contact with the soil, the untreated fabric becomes weakened to the point where the fastening pin 56 tears through the selvage with the exertion of slight force.

DESCRIPTION OF THE PREFERRED EMBODIMENTS

Preferred embodiments of the invention include those covers with selvages containing at least two closely adjacent warp ends of continuous multifilament U.V.-resistant polypropylene, the yarns each being approximately 800 denier, the most preferred cover being that illustrated in FIGURE 3 with the polypropylene warp yarns in two sets with two closely adjacent warp ends in each set and with the hemmed ends of the cover sewn with relatively fine polypropylene thread.

While simple 1 x 1 weave is the weave preferred for the covers of this invention, other weaves such as 2 x 2, 1 x 2 and the like may be utilized although they tend to be some what weaker and more apt to snag.

The treatment of cellulosic yarns to make them rot-resistant is not new. It is well known that metallic salts or soaps have ability as impregnants in providing rot resistance. The table below lists several effective compounds with the usual deposition range on weight of fabric indicated.

TABLE

| Compound | Deposition on Weight of Fabric |
| --- | --- |
| Copper Naphthenate | 0.2%-1.0% Copper Metal. |
| Copper Naphthenate and Phenyl Mercury (Acetate, Oleate, etc.) | 0.15%-0.8% Copper Metal; 0.035%-0.1% as Mercury. |
| Zinc Naphthenate | 0.5%-2.0% Zinc Metal. |
| Copper 8-quinolinolate | 0.1%-0.5% Copper Metal. |
| Copper Formate | 0.5%-1.0% Copper Metal. |
| Copper Oleate | 0.5%-1.0% Copper Metal. |
| Dihydroxydichlorodiphenyl Methane (G-4) | 1.0%-3% G-4 Available. |
| Melamine Formaldehyde Condensate Polymerized In Situ—With or Without Added Phenyl Mercury. | 5.0%-15% Melamine Condensate; .035%-0.1% as Mercury. |
| Acetylated or Cyanoethylated Modified Cellulose With or Without Added Fungicides. | |

I claim:

1. A light-weight substantially cellulosic woven covering adapted to be used with a seed bed or with plants to protect them from adverse effects of seasonal atmospheric conditions, birds and some insects, the body portion being formed of cellulosic, evenly spaced interwoven warp and filling yarns, the warp end count being within the range of about 12 to 40 ends per inch and the filling count being within the range of about 4 to 36 picks per inch, the improvement comprising selvage edges including in the warpwise direction at least two interwoven rot-resistant yarns, each of at least 150 denier selected from the group consisting of coated cellulosic yarns treated to increase rot-resistance and rot-resistant non-cellulosic polymeric and glass yarns.

2. The covering of claim 1 wherein the rot-resistant yarn is an acrylic polymer yarn.

3. The covering of claim 1 wherein the rot-resistant yarn is a polyamide yarn.

4. The covering of claim 1 wherein the rot-resistant yarn is a polyester yarn.

5. The covering of claim 1 wherein the rot-resistant yarn is an olefin polymer yarn.

6. The covering of claim 5 wherein each olefin polymer yarn is of at least 300 denier.

7. The covering of claim 6 wherein the olefin polymer yarn is a polypropylene yarn.

8. A light-weight substantially cellulosic woven covering adapted to be used with a seed bed or with plants to protect them from the adverse effects of seasonal atmospheric conditions, birds and some insects, the body portion being formed of cellulosic, evenly spaced interwoven warp and filling yarns, the warp end count within the range of about 12 to 40 ends per inch and the filling count being within the range of about 4 to 36 picks per inch, the improvement comprising selvage edges including in the warpwise direction at least one interwoven rot-resistant yarn of at least 800 denier selected from the group consisting of coated cellulosic yarns treated to increase rot-resistance and rot-resistant non-cellulosic polymeric and glass yarns.

References Cited

UNITED STATES PATENTS

| | | | |
| --- | --- | --- | --- |
| 2,401,997 | 6/1946 | Whitmann | 47—31 |
| 2,546,857 | 3/1951 | Grace | 139—383 |
| 2,787,570 | 4/1957 | Lott et al. | 139—420 |
| 3,199,547 | 8/1965 | Knutson | 139—383 |

HENRY S. JAUDON, Primary Examiner

U.S. Cl. X.R.

47—31